(12) United States Patent
Mauer

(10) Patent No.: US 7,262,383 B2
(45) Date of Patent: Aug. 28, 2007

(54) FEEDER DEVICE FOR A FIXING ELEMENT AND METHOD FOR THE OPERATION THEREOF

(75) Inventor: Dieter Mauer, Lollar (DE)

(73) Assignee: Newfrey LLC, Newark, DE (US)

( * ) Notice: Subject to any disclaimer, the term of this patent is extended or adjusted under 35 U.S.C. 154(b) by 403 days.

(21) Appl. No.: 10/495,166

(22) PCT Filed: Nov. 14, 2002

(86) PCT No.: PCT/EP02/12750

§ 371 (c)(1),
(2), (4) Date: Jul. 22, 2004

(87) PCT Pub. No.: WO03/043772

PCT Pub. Date: May 30, 2003

(65) Prior Publication Data

US 2004/0245220 A1      Dec. 9, 2004

(30) Foreign Application Priority Data

Nov. 22, 2001   (DE) ............................... 101 57 183

(51) Int. Cl.
*B23K 9/20* (2006.01)
(52) U.S. Cl. .......................................... 219/98; 219/99

(58) Field of Classification Search ................ 219/98, 219/99, 103; 269/281, 282, 283, 284
See application file for complete search history.

(56) References Cited

U.S. PATENT DOCUMENTS

| | | | | |
|---|---|---|---|---|
| 3,694,611 A | * | 9/1972 | Ettinger ........................ | 219/98 |
| 3,723,700 A | * | 3/1973 | Ettinger ........................ | 219/98 |
| 4,160,148 A | * | 7/1979 | Jenkins ........................ | 219/98 |
| 4,420,674 A | * | 12/1983 | Jordan ........................ | 219/99 |
| 4,435,630 A | * | 3/1984 | Jordan ........................ | 219/98 |
| 6,240,811 B1 | * | 6/2001 | Oesterle et al. ............. | 81/90.2 |

FOREIGN PATENT DOCUMENTS

| | | |
|---|---|---|
| DE | 43 24 223 A | 1/1995 |
| DE | 296 17 208 U | 12/1996 |
| DE | 100 28 420 A | 12/2001 |

* cited by examiner

*Primary Examiner*—Kevin Kerns
*Assistant Examiner*—Michael Aboagye
(74) *Attorney, Agent, or Firm*—Miles & Stockbridge P.C.

(57) ABSTRACT

A feed device for fastening elements with low length-to-diameter ratio has a hollow clamp into which individual fastening elements are inserted through a feed channel. The clamp has an internal pocket for pre-positioning a fastening element. A piston moves through the feed channel to engage the fastening element and to open the clamp to release the fastening element for further movement by the piston.

16 Claims, 4 Drawing Sheets

FEEDER DEVICE FOR A FIXING ELEMENT AND METHOD FOR THE OPERATION THEREOF

BACKGROUND OF THE INVENTION

The invention concerns a feed device for a fastening element comprising a positioning piston for positioning a fastening element, a catching clamp for pre-positioning the fastening element for the positioning piston and a housing for holding the positioning piston and the catching clamp, the housing having a feed channel for feeding the fastening element to the catching clamp and the positioning piston being adjustable for positioning the fastening element relative to the housing. Moreover the invention concerns a method for feeding a fastening element.

The reliable feeding of the fastening element to the positioning piston is essential for the automated positioning of a fastening element on a workpiece. Reliable feeding requires accurate pre-positioning of the fastening element. Accurate pre-positioning is particularly difficult if the fastening elements to be positioned are difficult to grasp and might tilt or tip easily.

For example, this is the case if a fastening element such as a rivet or an earthing stud is to be placed on a workpiece, the fastening element being short and thick and having a markedly varying diameter along its length.

Accurate spatial feeding of the fastening element has a role to play during the positioning process e.g. during a welding or soldering process, and influences the type of connection attained. Inaccurate feeding may lead, on the one hand, to faults in positioning the fastening element, which means increased wear on the positioning tool. On the other hand inaccurate feeding may lead to inaccurate positioning and therefore to inaccurate seating of the fastening element, which may require the repeating of the positioning of the fastening element and may be associated with expenditure and costs, particularly if a production method is interrupted.

Therefore the accurate feeding of the fastening element is important for a smooth positioning process and for the quality of the fastening to be attained.

The Gebrauchsmuster DE 296 17 208 U1 describes a stud holder for a stud welding device, where resilient holding fingers of various lengths extend in the longitudinal direction of a stud through-channel and grasp the stud. Because of the spring effect this stud holder is only suitable in the first instance for long narrow studs.

DE 32 18 886 discloses a stud placing machine where a stud is fed via a feed channel to the stud welding device, the stud being held by a stud stop for pre-positioning and the stud being grasped by a stud collet chuck. The stud collet chuck moves the stud in the direction of the workpiece at the same time pushing the stud stop to one side with the stud. There is a risk here that the stud might be moved and tilted spatially by the forces of the stud stop working on it so that, in particular where the positioning piston applies only moderate holding forces, the position of the stud and its axial location are only inaccurately determined.

BRIEF DESCRIPTION OF THE INVENTION

Therefore it is the object of the aforementioned invention to create a feed device and a method for feeding a fastening element, the fastening elements being able to be positioned in a simple and cost effective manner with great accuracy and precise axial alignment.

The feed device according to an embodiment of the invention comprises a positioning piston for holding a fastening element during the placement process, a catching clamp for pre-positioning the fastening element for the positioning piston and a housing to hold the positioning piston and the catching clamp, the housing having a feed channel for feeding the fastening element to the catching clamp, and the positioning piston for positioning the fastening element being adjustable relative to the housing and the positioning piston being coupled with the catching clamp in such a way that the catching clamp may be opened and closed during forward and backward movement of the positioning piston essentially independently of the axial forward movement of the fastening element.

BRIEF DESCRIPTION OF THE DRAWINGS

The invention will be further described in conjunction with the accompanying drawings, which illustrate best mode embodiments of the invention, and wherein.

DETAILED DESCRIPTION OF THE INVENTION

Figure 1:
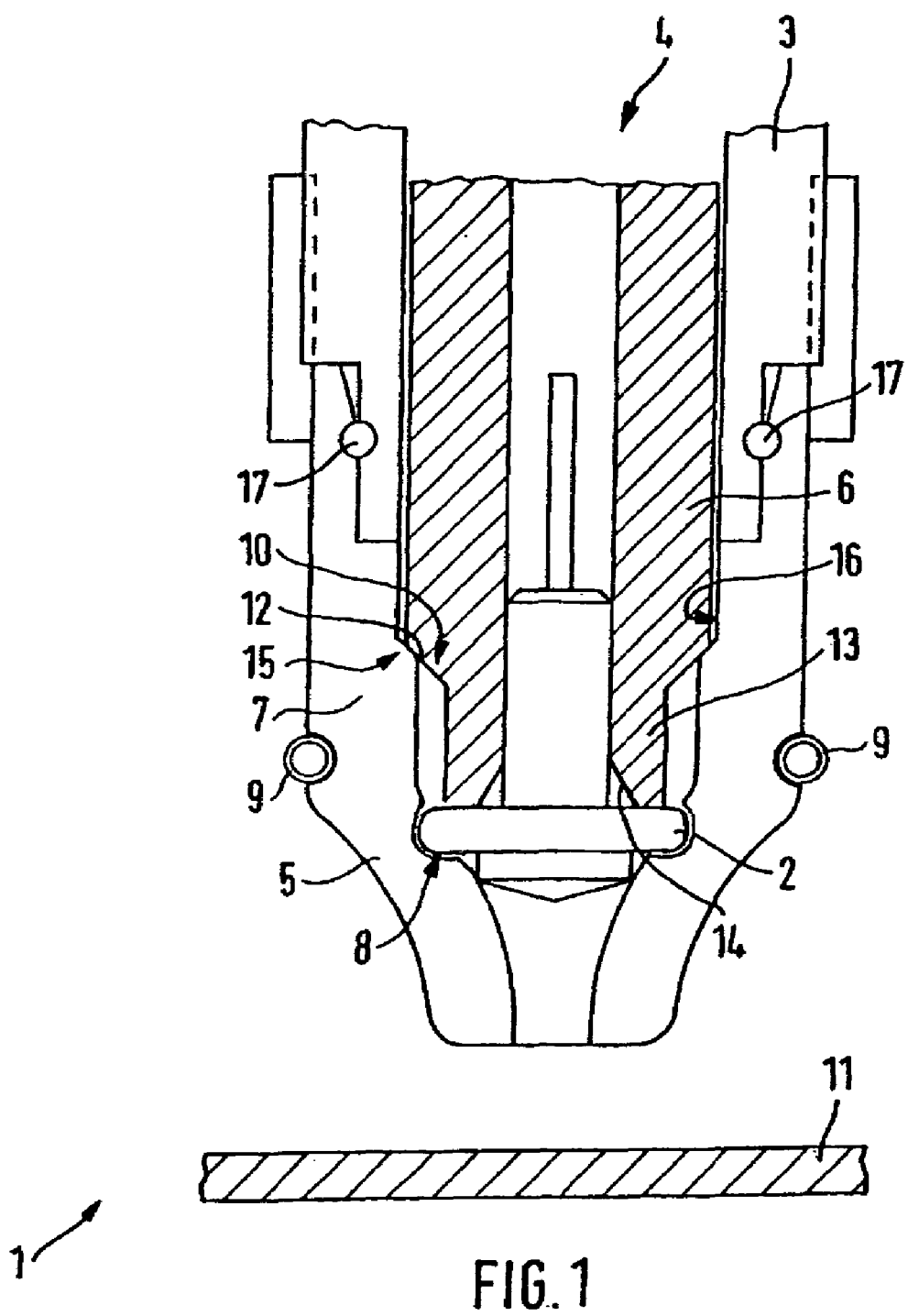
FIG. 1 shows a feed device according to the invention where a catching clamp holds a fastening element.

The invention will first be described generally with reference to various embodiments and will then be described in greater detail.

A fastening element is fed to the catching clamp with the aid of the feed channel. Here the fastening element may, for example, be introduced with the aid of a feeder or via a tube driven by compressed air. The catching clamp has the object of catching the fastening element i.e. grasping it, and pre-positioning it for the positioning piston. When the fastening element is caught the fastening element opens the catching clamp a little and then engages into the catching pocket. The positioning piston, on the other hand, carries out the actual positioning and placement process by grasping the fastening element and moving it in the direction of the workpiece. The fastening element may then be connected to the workpiece. For example with the aid of the positioning piston the spacing between fastening element and workpiece required during a placement process may be adjusted and the requisite spatial track of the fastening element may be synchronised with respect to the workpiece.

Because of the joint effect of the catching clamp and the positioning piston it is possible to attain high reproducibility of the position and axial alignment of the fastening element even with short fastening elements having large diameters or with fastening elements having diameters which vary greatly over their length. Tilting or tipping of the fastening element in the feed device are avoided and disturbances in the placement process are therefore avoided and wear on the feed device is reduced. The pre-positioning of the fastening element using the catching clamp allows a high degree of positioning accuracy of the fastening element in the positioning piston.

The ratio of a typical length of a fastening element to its diameter is less than 2:1, in particular 1.5:1, preferably 1:1. The fastening element may, for example, be a rivet, an earthing stud or a weld nut.

According to the invention the positioning piston is coupled with the catching clamp so that the positioning piston can open and close the catching clamp. This prevents the fastening element as such opening and closing the catching clamp, thereby causing unnecessary forces from the catching clamp onto the fastening elements which might lead to inaccuracy of the positioning of the fastening element in the positioning piston. The opening of the catching clamp is not achieved with the aid of the fastening element, but directly via the positioning piston. The positioning piston and the catching clamp thereby form double chucks and double clamps which combine a high repetition rate of the placement method with high positioning accuracy of the fastening element on the workpiece. An exact seating of the fastening elements is obtained through the high positioning accuracy during the placement process.

In a preferred embodiment of the invention the positioning piston has a guide channel and the clamps have an inner contour with a pressure area, the guide channel being pressed against the pressure area during the forward movement of the positioning piston to open the catching clamp. A coupling is obtained between positioning piston and catching clamp by means of the guide channel and pressure area of the inner contour. This coupling has the effect that during a forward movement of the positioning piston, for example in the direction of the workpiece, the catching clamp is opened by the positioning piston independently of the fastening element. The closing of the catching clamp when the positioning piston withdraws is preferably brought about by spring force.

The opening of the catching clamp releases the fastening element from the catching clamp so that the positioning piston may then position the fastening element. The fastening element may be positioned, for example, by welding the fastening element. Using a suitable method the positioning piston is arranged in such a way in the catching clamp that the catching clamp swings open through its forward movement. Then the fastening element is positioned, in particular connected with the workpiece by jointing technology. For example, the fastening element may be connected to the workpiece by an arc welding method, by resistance welding or soldering. The advantage of the coupling between positioning piston and catching clamp consists in the fact that the fastening element does not experience any further forces beyond the holding forces of the positioning piston.

In a further embodiment of the feed device according to the invention the guide channel is formed through an enlargement of the outside diameter of the positioning piston. With the aid of the enlarged outside diameter of the positioning piston a force is exerted during its forward movement onto the pressure area of the catching clamp, before the fastening element is moved by means of the opened catching clamp.

In an advantageous embodiment of the invention the guide channel has a bevelled edge with respect to the catching clamp. Here it is of no importance whether the guide channel or the pressure area or both are bevelled. What is important is that opening of the catching clamp which is as smooth as possible should be obtained through the guide channel. Alternatively the pressure area and the guide channel may be rolled against one another with the aid of roller bearings or ball bearings, reducing wear on the other adjacent surfaces and thus increasing the durability of the feed device.

According to the invention the catching clamp has a catching pocket to catch the fastening element. The catching clamp has the object of reliably catching a fastening element supplied fast for example by compressed air and pre-positioning it in the correct position so that the positioning piston may receive the fastening element with high accuracy before the placement process. The catching pocket contributes to a reliable pre-positioning during catching. It is an advantage if this catching pocket is adapted to the fastening element receiving it. For example, the catching pocket forms the profile of the fastening element, in particular the front outer part of the fastening element. Reliable catching of the fastening element and sufficiently accurate pre-positioning of the fastening element are facilitated for the positioning piston by the interlocking fit.

In a specific embodiment of the feed device according to the invention the catching clamp is formed using at least two legs pivotally mounted on the housing. The legs are able to hold the fastening element and to release the fastening element. During a forward movement the legs are tilted in such a way that the fastening element is released. The positioning piston pushes the fastening element in the direction of the workpiece.

In an advantageous specific embodiment of the invention the catching clamp has a spring for clamping the fastening element. With the aid of the spring the fastening element is clamped during catching and during pre-positioning for the positioning piston. The fastening element is caught securely because of the elasticity of the catching clamp induced by means of the spring.

In one specific embodiment of the feed device according to the invention the positioning piston has clamping arms to hold the fastening element. The clamping arms can be in the form of particularly rigidly designed flexible springs with which the fastening element is securely held and accurately positioned. The clamping arms have the function of compensating for any inaccuracies during pre-positioning of the fastening element and moving the fastening element into a predetermined position. The more accurate the pre-positioning, the more rigid the clamping arms chosen, which leads to higher accuracy during positioning. In arc welding processes higher rigidity of the clamping arms leads to improved contact resistance between tool and fastening element, thereby reducing the wear on the tool.

In a development of the feed device according to the invention, the clamping arms have entry chamfers to guide the fastening element into the positioning piston. With the aid of entry chamfers the receiving of the fastening element by the catching clamp through the positioning piston is made easier. They aid the positioning piston in the event of inaccurate pre-positioning when receiving the fastening element.

In a specific embodiment of the feed device according to the invention the fastening element is a weldable or solderable stud, in particular with a length to diameter ratio of less than 2, preferably less than 1. Alternatively the fastening element may be a nut which is either weldable or solderable.

The method according to the invention for positioning a fastening element onto a workpiece comprises the following method stages: a fastening element is introduced via a feed channel of the catching clamp and caught by the catching clamp in the catching pocket by latching; the catching clamp positions the fastening element for the positioning piston and the positioning piston grasps the fastening element; the catching clamp is opened and closed during forward and backward movement of the positioning piston essentially independently of the axial forward movement of the fastening element and the fastening element is moved in the direction of the workpiece; the fastening element is connected to the workpiece using a standard jointing method; the positioning piston moves back into its starting position as the catching clamp closes.

In a specific embodiment of the invention the positioning piston is tubular in design. The inside diameter of the positioning piston is approximately equal to its outside diameter of the upper end of the fastening element to be positioned. Clamping arms are formed by simply cross-jointing the tubular positioning piston, providing the requisite elasticity in the positioning piston when receiving and holding a fastening element.

For a high speed during positioning of a fastening element the quick feeding of the fastening element to the catching clamp is expedient. Depending on the type of feed the catching clamp must be adapted to the shape of the fastening element so that catching the fastening element is quick and secure. The positioning piston grasps the fastening element in the catching clamp. The pre-positioning of the fastening element produces greater accuracy in positioning the fastening element through the positioning piston. The interaction of the positioning piston and catching clamp avoids additional forces on the fastening element and the clamping arms beyond those of holding. The positioning piston opens the catching clamp whilst the fastening element is pushed in the direction of the workpiece. When the fastening element is being pushed in the direction of the workpiece the fastening element is held firmly and securely by the positioning piston.

Common industrial jointing methods may be adopted for attaching the fastening element to the workpiece. In particular resistance welding, arc welding or soldering have been shown to be appropriate. Alternatively clamping methods or gluing methods may also be used. The catching clamp is released through the backward movement of the positioning piston into the starting position and springs back into the closed position. The catching clamp may then receive a new fastening element.

FIG. 1 shows a feed device according to the invention diagrammatically in longitudinal section with a catching clamp 5 holding a fastening element 2 with the aid of a catching pocket 8 and with a positioning piston 6 which has grasped the fastening element 2 with the aid of clamping arms 13. The fastening element 2 is fed via a feed channel 4 of the catching clamp 5 before the positioning piston 6, after pre-positioning of the fastening element 2, grasps the fastening element 2 through the catching pocket 8 of the catching clamp 5. The catching clamp 8 has legs 7 pivotally mounted on an arrangement of bearings 17 which press against the fastening element 2 with the aid of a spring 9. The spring 9 is designed as a spiral spring running in a peripheral groove around the catching clamp 5. The legs 7 have catching pockets 8 which are adapted to the shape of the fastening element 2 to obtain particularly accurate pre-positioning of the fastening element 2. The catching clamp 5, the positioning piston 6 and the feed channel 4 are associated with a housing 3, the positioning piston 6 being adjustable with respect to the housing 3 and, in particular, being able to carry out a movement forwards and backwards in the direction of the workpiece 11. The clamping arms 13 are equipped at their ends with chamfers 14 which facilitate the grasping of the fastening element 2. The positioning piston 6 has a conical guide channel 10 with a bevelled edge 12, with which the legs 7 may be tilted with the aid of a pressure area 15. Through the coupling of the positioning piston 6 with the catching clamp 5 via the guide channel 10 and the pressure area-15 it is possible to open the catching clamp 8 during a forward movement of the positioning piston 6 in the direction of the workpiece 11.

Figure 2:
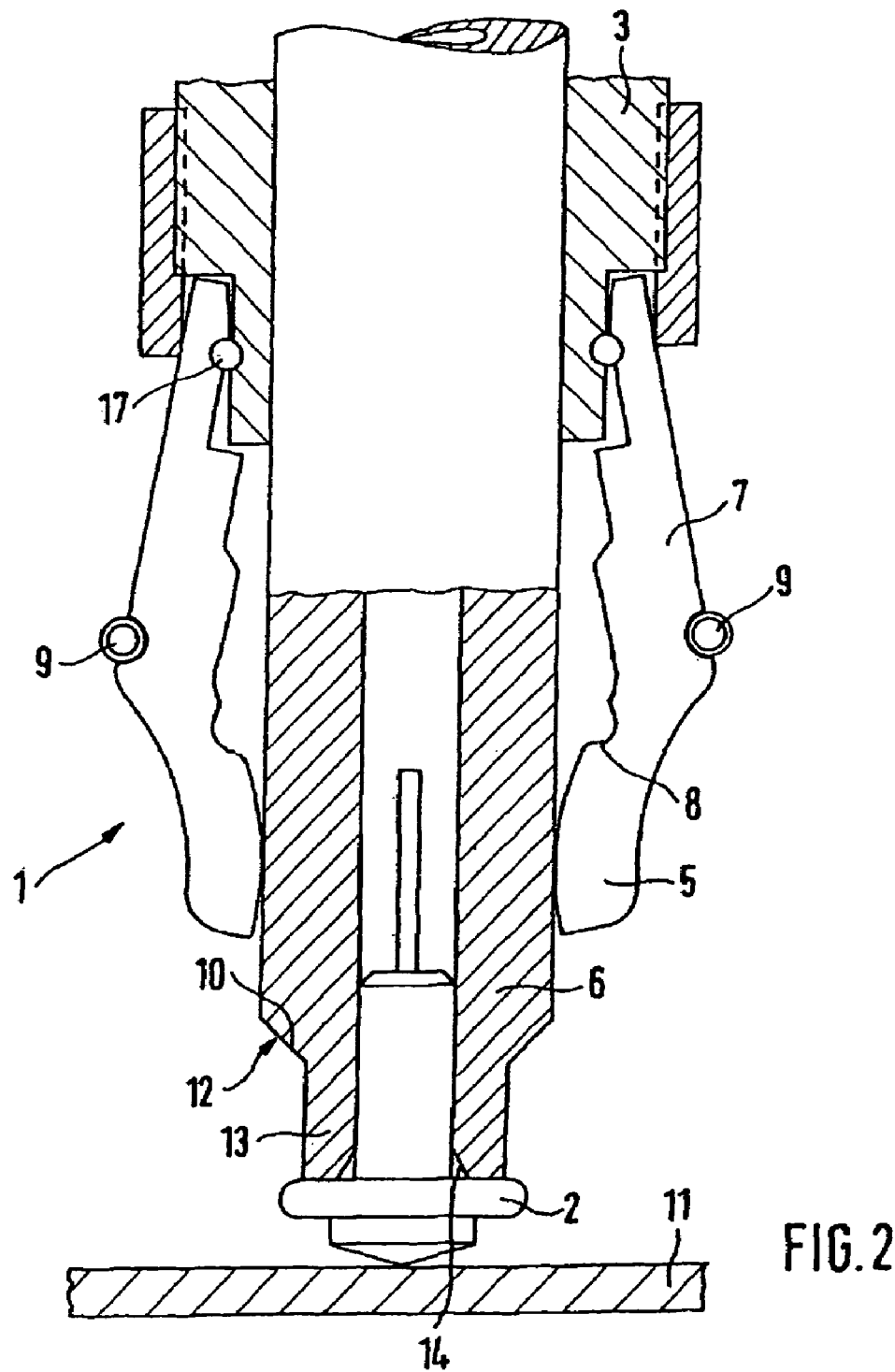
FIG. 2 shows the feed device according to FIG. 1 where the positioning piston is moved with the fastening element in the direction of the workpiece.

FIG. 2 shows the feed device according to the invention as in FIG. 1, the difference being that the positioning piston 6 is moved in the direction of the workpiece 11. The legs 7 have been opened by the positioning piston 6 independently of the movement of the fastening element 2 against the dynamic effect of the spring 9. The fastening element 2 is held by the clamping arms 13.

Figure 3:
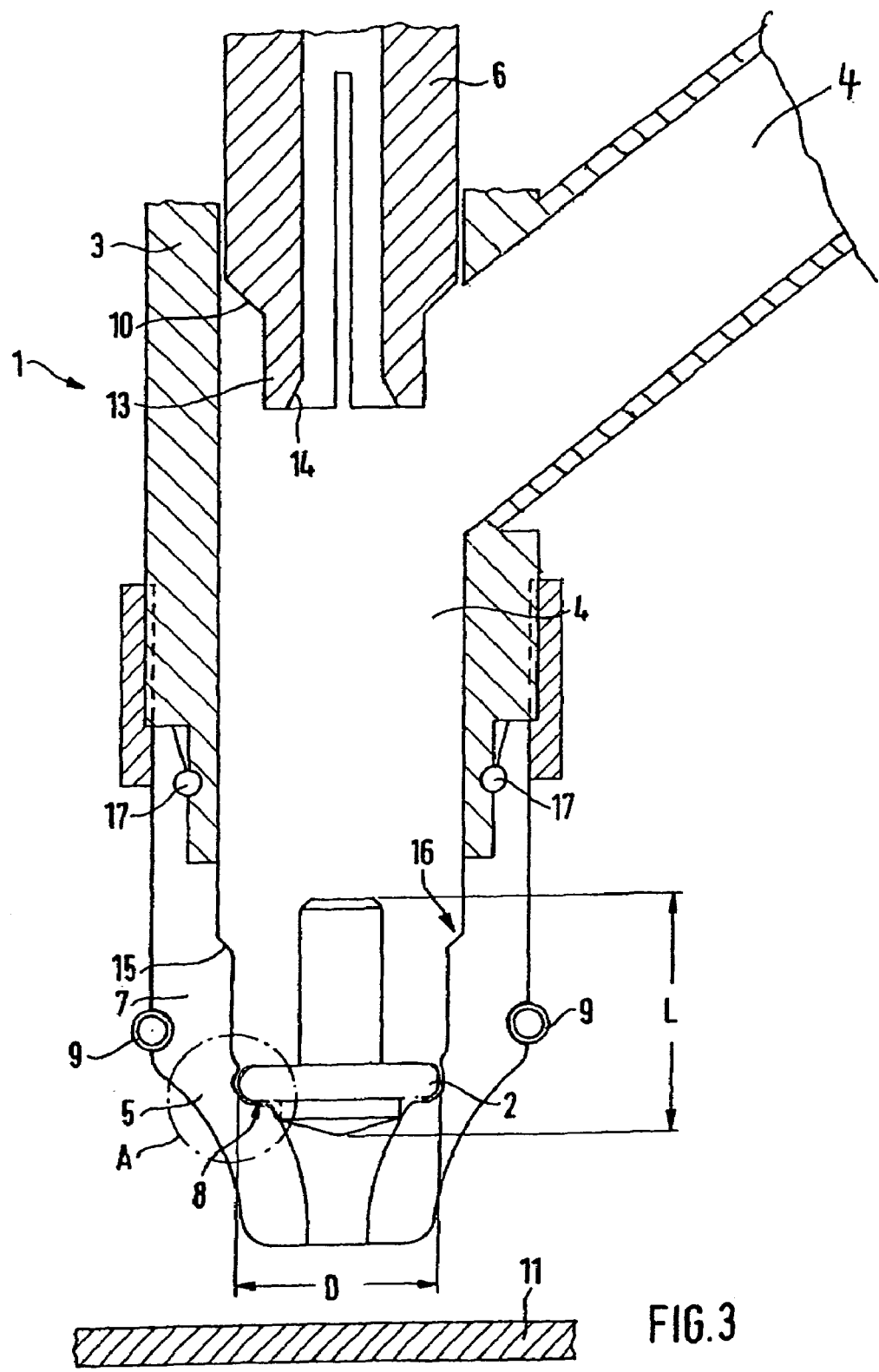
FIG. 3 shows the feed device according to FIG. 1 and FIG. 2 where the positioning piston is moved away from the workpiece.

FIG. 3 shows a feed device according to FIG. 1 and FIG. 2 where the positioning piston 6 is moved away from the workpiece 11, the feed channel 4 being released for the feeding of the fastening element 2. The fastening element 2 is held by the catching clamp 5 and is pre-positioned by the latter so that the positioning piston 6 can then grasp the fastening element 2 with its clamping arms 13, and the entry chamfers 14 make an advantageous contribution here.

Figure 4:
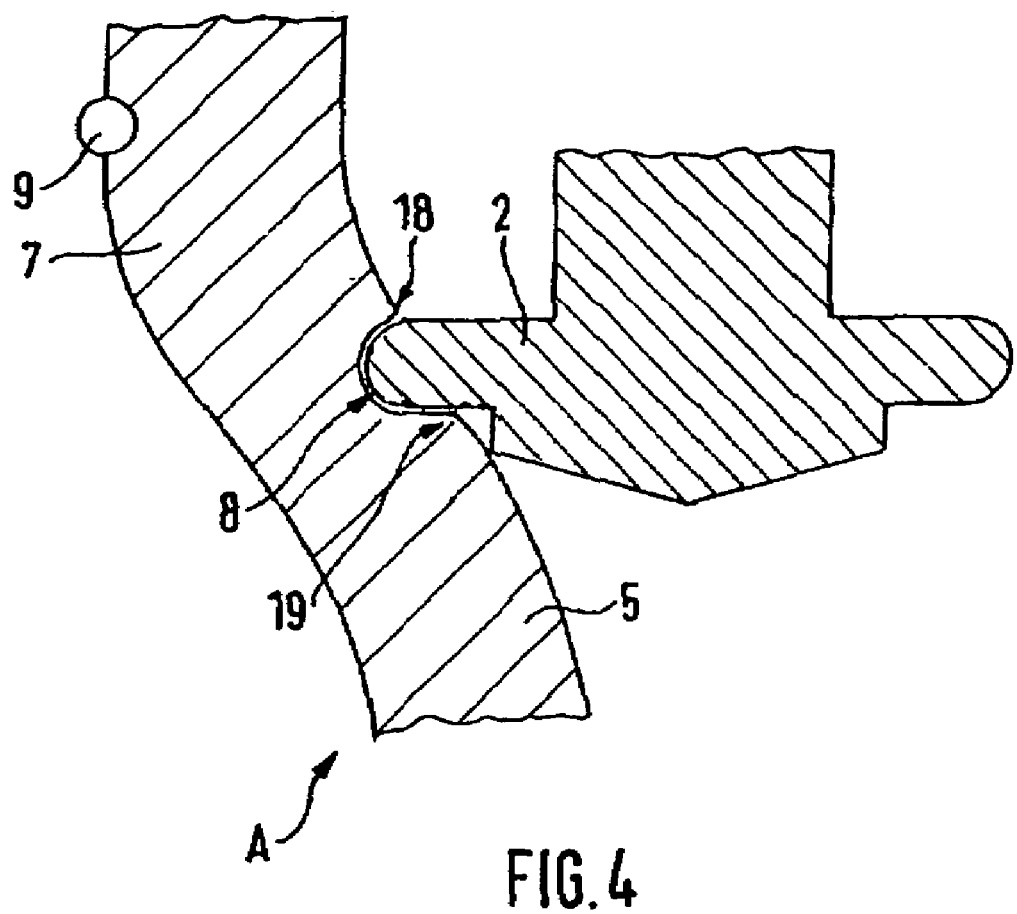
FIG. 4 shows a view of the detail A marked in FIG. 3.

FIG. 4 shows a view of the detail A marked in FIG. 3 with the leg 7 showing the catching pocket 8 in which the fastening element 2 is engaged. The engaging mechanism of the catching pocket 8 is produced by the combined effect of the upper edge 18 of the catching pocket 8, the lower edge 19 of the catching pocket 8 and the spring 9, the fastening element 2 being adapted in shape to the catching pocket 8 and being held in this by the spring 9. If the fastening element 2 is pre-positioned, i.e. introduced into the catching pocket 8, the leg 7 is firstly pushed somewhat to the side by the fastening element 2; it is then held securely in the indentation formed by the upper edge 18 or lower edge 19 of the catching pocket 8. The engagement 2 brings about an accurate axial alignment of the fastening element 6. The opening of the catching clamp 5 is not caused by the fastening element 2 but by the positioning piston 6. This separates the pre-positioning of the fastening element 2 for the positioning piston 6 from the positioning of the fastening element 2 in the direction of a workpiece 11.

The invention concerns a feed device 1 comprising a positioning piston 6 to hold a fastening element 2 during positioning, a catching clamp 5 to pre-position the fastening element 2 for the positioning piston 6 and a housing 3 to hold the positioning piston 6 and the catching clamp 5, the housing 3 having a feed channel 4 to feed the fastening elements 2 to the catching clamp 5 and the positioning piston 6 for positioning the fastening element 2 being displaceable relative to the housing 3, wherein that during forward and backward movement of the positioning piston 6 the catching clamp 5 may be opened and closed substantially independently of the axial forward movement of the fastening element 2. The invention is characterised in that through the coupling of the positioning piston 6 and the catching clamp 5 a particularly fast and reliable positioning of a fastening element 2 is facilitated, in particular with a relatively low length to diameter ratio.

The invention claimed is:

1. Feed device (1) for a fastening element (2) comprising a positioning piston (6) for engaging and positioning the fastening element (2), a catching clamp (5) with a catching pocket (8) therein for receiving and pre-positioning the fastening element (2) before its engagement with the positioning piston (6), and a housing (3) for holding the positioning piston (6) and the catching clamp (5), the housing (3) having a feed channel (4) for feeding the fastening element (2) to the catching clamp (5), and the positioning piston (6)

being displaceable relative to the housing (3), wherein the positioning piston (6) is movable forward into the catching clamp to engage the fastening element and is coupled with the catching clamp (5) in such a way that during forward movement of the positioning piston the catching clamp (5) is opened by the positioning piston to release the fastening element (2) for forward movement by the positioning piston (6).

2. Feed device (1) according to claim 1, wherein the positioning piston (6) has a guide surface (10) and the catching clamp (5) an inner contour (16) with a pressure area (15), the guide surface (10) pressing against the pressure area (15) during the forward movement of the positioning piston (6) to open the catching clamp (5).

3. Feed device (1) according to claim 2, wherein the guide surface (10) is formed by a chance of the outside diameter of the positioning piston (6).

4. Feed device (1) according to claim 2, wherein the guide surface (10) is formed by an outward expansion of the positioning piston (6).

5. Feed device (1) according to claim 2, wherein the guide surface (10) has a bevelled edge (12) with respect to the catching clamp (5).

6. Feed device (1) according to claim 1, wherein the shape of the catching pocket (8) complements the fastening element (2) to be received.

7. Feed device (1) according to claim 1, wherein the catching clamp (5) is formed by at least two legs (7) pivotally mounted on the housing (3).

8. Feed device (1) according to claim 7, wherein each leg (7) has part of the catching pocket (8) to receive the fastening element (2).

9. Feed device (1) according to claim 1, wherein the catching clamp (5) has a spring (9) for closing the catching clamp and clamping the fastening element (2).

10. Feed device (1) according to claim 1, wherein the positioning piston (6) has arms (13) for holding the fastening element (2).

11. Feed device (1) according to claim 10, wherein the arms (13) have entry chamfers (14) for guiding the fastening element (2) into the positioning piston (6) between the arms.

12. Feed device (1) according to claim 1, wherein the positioning piston (6) is tubular to receive a portion of the fastening element.

13. Feed device (1) according to claim 1, wherein the fastening element (2) is a weldable or solderable stud with a length to diameter ratio of less than 2.

14. Feed device (1) according to claim 1, wherein the fastening element (2) is a weldable or solderable nut.

15. Feed device (1) according to claim 1, wherein the fastening element is a weldable or solderable stud with a length to diameter ratio of less than 1.

16. Method of feeding a fastening element onto a workpiece (11) comprising the following method stages:

a. a fastening element (2) is fed via a feed channel (4) of a catching clamp (5) and is caught by the catching clamp (5) in an internal catching pocket (8) by latching;

b. the catching clamp (5) positions the fastening element (2) for subsequent grasping by a positioning piston (6) and the positioning piston (6) thereafter grasps the fastening element (2);

c. the catching clamp (5) is engaged by the positioning piston and is thereby opened to release the fastening element from the catching pocket during forward movement of the positioning piston (6) and the fastening element (2) is moved in the direction of a workpiece (11) by the positioning piston;

d. the fastening element (2) is connected to the workpiece (11); and e. the positioning piston (6) moves backward to a starting position as the catching clamp (5) closes.

\* \* \* \* \*